Oct. 12, 1948.                    J. H. MYERS                    2,451,402
                                     RAKE
Filed Aug. 18, 1944                                        2 Sheets-Sheet 1
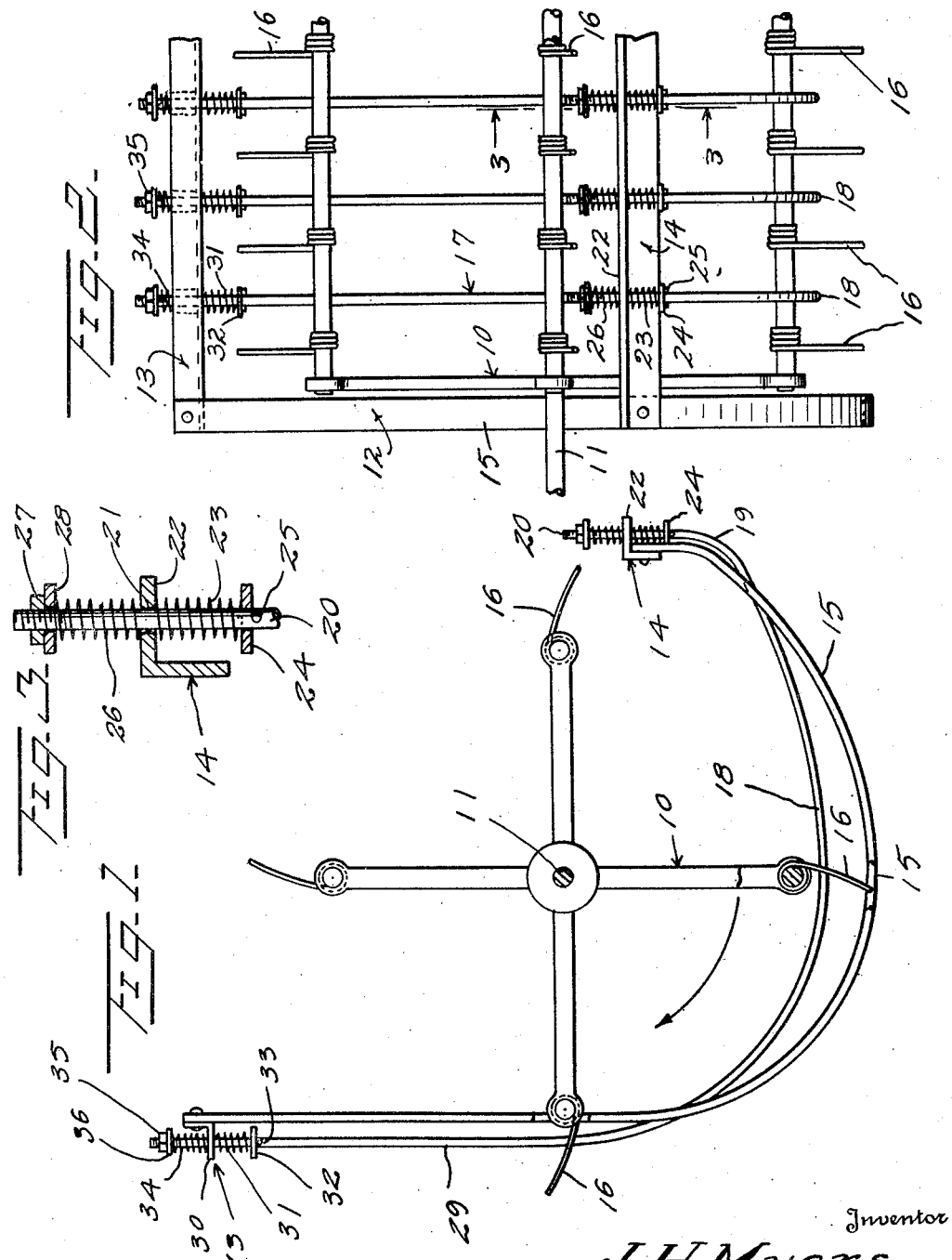
Inventor
J. H. Myers
By Kimmel & Crowell
Attorneys

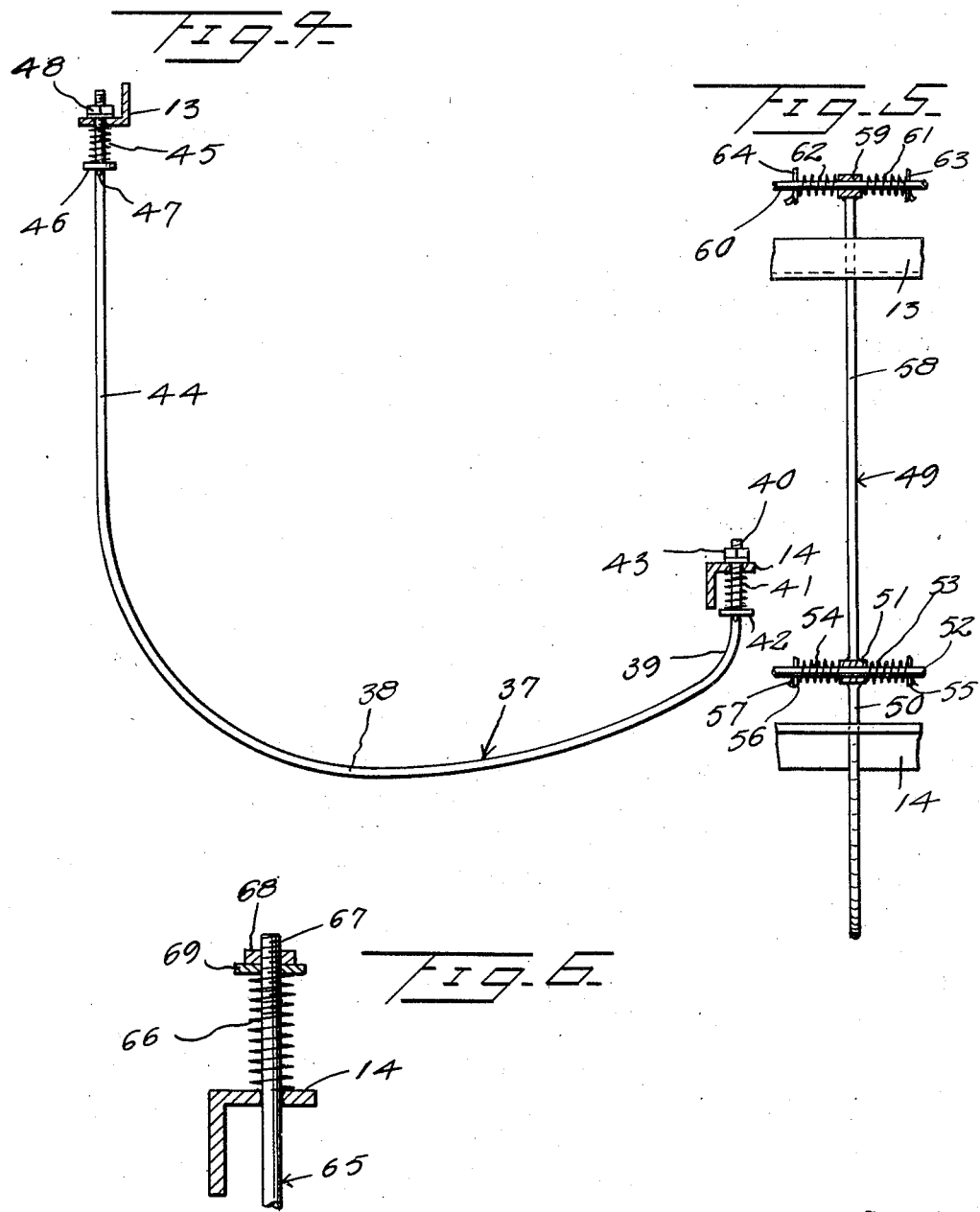

Patented Oct. 12, 1948

2,451,402

UNITED STATES PATENT OFFICE 2,451,402

RAKE

John H. Myers, Tornillo, Tex.

Application August 18, 1944, Serial No. 550,064

5 Claims. (Cl. 56—377)

1

This invention relates to rakes and more particularly to an improved stripper for the rotary raking reel.

An object of this invention is to provide an improved stripper construction which is adapted to be secured to the supporting frame of the reel and which includes means whereby the strippers or guards will be yieldable with respect to the frame.

Another object of this invention is to provide in a side delivery rake a plurality of strippers for the rotary tines and which are so constructed and arranged as to provide resiliency to the strippers while at the same time the strippers per se may be made of substantially rigid material.

A further object of this invention is to provide in a construction of this kind an improved stripper for the rotary rake or reel wherein the opposite ends of the stripper bars are yieldably supported so as to prevent bending or breaking of the rotary tines in the event any material becomes clogged between the strippers.

A further object of this invention is to provide a stripper construction of this kind wherein the stripper bars may be made out of any suitable materials such as flat, round, or the like, which has an inherent degree of resiliency, the stripper bars or rods being spring tensioned with respect to the supporting frame so that these rods may have movement relative to the frame.

With the foregoing objects and others which may hereinafter appear, the invention consists of the novel construction, combination and arrangement of parts as will be more specifically referred to and illustrated in the accompanying drawings, wherein are shown embodiments of the invention, but it is to be understood that changes, variations, and modifications may be resorted to which fall within the scope of the invention as claimed.

In the drawings:

Figure 1 is a vertical section of a reel or rake having mounted on the frame thereof a stripper construction embodying this invention.

Figure 2 is a fragmentary plan view of the rake structure.

Figure 3 is a fragmentary sectional view taken on the line 3—3 of Figure 2.

Figure 4 is a vertical section, partly in elevation, of a modified form of stripper construction.

Figure 5 is a fragmentary sectional view, partly in elevation, of another modification of this invention, and Figure 6 is a fragmentary vertical section of a further modification of this invention.

Referring to the drawing, the numeral 10 designates generally a rotary rake or reel which is mounted on a drive shaft 11 mounted for rotation with respect to a supporting frame generally

2 designated as 12. The supporting frame 12 includes a pair of longitudinal angle members 13 and 14 which have secured to the opposite ends thereof a bowed guard member 15. The guard member 15 is adapted when the rake is in operative position to slidingly engage on the ground so that the tines 16 of the rake may contact with the material which is being picked up from the surface of the ground.

A plurality of strippers generally designated as 17 are carried by the frame 12, and each stripper 17 comprises a bowed or longitudinally bent bar having an arcuate lower portion 18 which is upwardly bent as at 19 and formed into a vertical extension 20. The extension 20 slidingly engages through an opening 21 which is formed in the horizontal side 22 of the angle member 14, and a lower spring 23 bears at its upper ends against the lower face of the horizontal side 22 and at its lower end bears against a washer or collar 24 which may be fixed by means of a pin or weld 25 with respect to the vertical extension 20.

A second and upper spring 26 is disposed about the vertical extension 20, bearing at its lower end against the upper face of the horizontal side 22 and at its upper end a tensioning nut 27 is threaded on extension 20 with a washer 28 interposed between nut 27 and spring 26. The opposite or forward portion of the bar 17 includes an elongated vertical extension 29 which is substantially longer than the vertical extension 20 and slidingly engages through the horizontal side 30 of the angle member 13. A lower spring 31 is disposed about the extension 29 bearing against the lower face of the horizontal side 20 and also against a collar or washer 32 which is fixed by means of a pin or weld 33 against downward movement with respect to the rod or extension 29. An upper spring 34 is positioned about the upper end portion of the extension 29, bearing at its lower end against the upper face of the horizontal side 30. A spring tensioning nut 35 is threaded on the upper end of extension 29 and a washer 36 is interposed between nut 35 and spring 34. The provision of the upper and lower springs at the opposite ends of the stripper bar 17 provides a means for yieldably resisting upward and downward movement of the stripper bar with respect to the frame members 13 and 14.

Referring now to Figure 4, there is disclosed a modified form of stripper bar, generally designated as 37. The bar 37 includes a lower arcuate portion 38 which terminates at its rear end in a bend 39, and the bend 39 is formed with a vertical extension 40. The extension 40 is slidable through an opening provided in the horizontal side of the angle member 14 and a lower spring 41 engages beneath the angle member 14, being positioned about the extension 40 and bearing at its lower end against a washer or collar 42. A nut 43 is threaded onto the upper end of the extension 40 and provides a means whereby the spring 41 may be tensioned to the desired degree.

The opposite or forward end of the arcuate lower portion 38 is formed with an elongated vertical extension or supporting member 44 which slidingly engages through the forward angle frame member 13. A spring 45 is positioned about the extension or supporting member 44 bearing at its upper end against the angle member 13 and at its lower end against a collar or washer 46 which is fixed by means of a pin or weld 47 against downward movement with respect to the supporting member or extension 44. A nut 48 is threaded onto the upper end of the extension 44 bearing against the upper face of the angle member 13 and provides a means whereby the spring 45 may be tensioned to the desired degree.

Referring now to Figure 5, there is disclosed another modification of this invention including a stripper bar 49 which has a configuration similar to the stripper bars 17 and 37. In this form of the invention, the rear end of the stripper member 49 is formed with an upright extension 50 slidingly engaging through the rear frame member 14, and the terminal upper end of extension 50 is formed with a horizontal sleeve 51. A horizontally disposed resilient supporting bar or rod 52 is fixed in any suitable manner with respect to the frame of the rake, and the rod or supporting member 52 loosely engages through the sleeve 51. The sleeve 51 is held against endwise movement with respect to the supporting member 52 by means of oppositely disposed springs 53 and 54. One end of the spring 53 engages against the adjacent end of the sleeve 51 and the opposite end of the spring 53 engages against a washer 55 which is fixed in any suitable manner with respect to the supporting member 52. The spring 54 bears at one end against the adjacent end of the sleeve 51 and the opposite end of the spring 54 bears against a washer 56 which may be held against movement away from the sleeve 54 by means of a pin or other fastening member 57.

The forward end of the stripper bar 49 is formed with an upright extension 58 which slidingly engages through the forward frame bar 13 and the terminal upper end of the extension 58 has secured thereto a sleeve 59. A forward supporting bar or rod 60 loosely engages through the sleeve 59, being secured in any suitable manner at the opposite ends thereof to the frame of the rake. Oppositely disposed springs 61 and 62 engage against the opposite ends of the sleeve 59 and against washers 63 and 64, respectively, which are pinned or otherwise fixed relative to the supporting member 60.

Referring now to Figure 6, there is disclosed a further modification of this invention, there being shown only one end of a stripper bar 65 which may be similar in configuration to the stripper bars 17 and 37. The stripper bar 65 is adapted to slidingly engage through the horizontal frame members of the rake structure, one of these frame members 14 being herein shown, and a spring 66 is positioned about the vertical end 67 of the stripper bar 65, and bears at its lower end against the upper side of the angle member 14. The spring 66 is tensioned by means of a nut 68 and a washer 69 is interposed between nut 68 and spring 66.

In the use and operation of this invention, the stripper bars 17 are disposed between pairs of tines 16 forming the rotary reel or rake 10. The opposite ends of the stripper bars 17 are yieldably held against upward and downward movement by means of the springs 23, 26, 31 and 34. As the rake is moving over the surface of the ground, in the event an obstruction should be encountered between the guards 15 at the opposite ends of the reel, this obstruction will strike the lower arcuate portion 18 of one or more of the stripper bars 17. The stripper bars 17 may bend upwardly between the sides of the frame, and in bending upwardly the stripper bar or bars contacting the obstruction will be forced upwardly against the tension of the lower springs 23 and 31. When the obstruction has been passed over, springs 23 and 31 will return the stripper bars which contacted the obstruction to their normal position which is a balanced position formed by the oppositely disposed upper and lower springs.

The operation of the structure shown in Figure 4 is similar to that of the construction shown in Figures 1, 2, and 3, with the exception that the springs 41 and 45 are tensioned by the threaded nuts 43 and 48. In this manner, the springs 41 and 45 may be placed under any desired tension so that the stripper bars 37 may have upward movement resisted by the predetermined tension of the springs 41 and 45.

With the construction shown in Figure 5, the elongated supporting members 53 and 60 form the yieldable support for the stripper bars so that these bars may have limited upward movement when an obstruction is encountered, and forward or rearward movement of the stripper bars on the supporting members 52 and 60 is resisted in either direction by the oppositely disposed springs 53 and 54 and springs 61 and 62.

With the construction shown in Figure 6, the stripper bars 65 may freely slide upwardly in the frame members and are yieldingly held against downward movement by the spring 66 at the opposite end thereof.

What is claimed is:

1. In a rake having a frame formed of horizontal bars and a rotary raking reel, a stripper means for the reel comprising a substantially U-shaped member having the legs thereof upright, the rear leg of said member being substantially shorter than the front leg thereof, said legs slidingly engaging through said horizontal bars, and yieldable means engaging the free ends of the legs of said member holding said member against vertical sliding movement in at least one direction.

2. In a rake as set forth in claim 1 including means for tensioning said yieldable means.

3. In a rake having a frame formed of horizontal bars and a rotary raking reel, a stripper means for the reel slidingly carried by said bars comprising a substantially U-shaped member having the legs thereof upright, the rear leg of said member being substantially shorter than the front leg thereof, said legs slidingly engaging through said horizontal bars, and yieldable means engaging the free ends of the legs of said member holding said member against upward and downward movement.

4. In a rake as set forth in claim 1 wherein said yieldable means engages against the lower sides of said horizontal bars for yieldably holding said member against upward movement.

5. In a rake having a frame formed of horizontal bars and a rotary raking reel, a stripper means for the reel slidably carried by said bars comprising a substantially U-shaped member having the legs thereof upright, the rear leg of said member being substantially shorter than the front leg thereof, said legs slidingly engaging through said horizontal bars, a sleeve carried by the upper ends of the legs of said member, a pair of elongated horizontal supporting members engaging through said sleeves, and a pair of oppositely disposed springs for each sleeve about a supporting member and yieldingly holding said sleeve against endwise movement.

JOHN H. MYERS.

REFERENCES CITED

The following references are of record in the file of this patent:

UNITED STATES PATENTS

| Number | Name | Date |
|---|---|---|
| 757,122 | Kadel et al. | Apr. 12, 1904 |
| 1,150,206 | Kirk | Aug. 17, 1915 |
| 1,185,593 | Rodemeyer et al. | May 30, 1916 |